(12) United States Patent
Wang et al.

(10) Patent No.: US 10,204,188 B2
(45) Date of Patent: Feb. 12, 2019

(54) SYSTEMS, METHODS AND COMPUTER PROGRAM PRODUCTS FOR ANALYZING PERFORMANCE OF SEMICONDUCTOR DEVICES

(71) Applicant: Samsung Electronics Co., Ltd., Suwon-si (KR)

(72) Inventors: Jing Wang, San Jose, CA (US); Nuo Xu, San Jose, CA (US); Woosung Choi, Pleasanton, CA (US)

(73) Assignee: Samsung Electronics Co., Ltd. (KR)

( * ) Notice: Subject to any disclaimer, the term of this patent is extended or adjusted under 35 U.S.C. 154(b) by 128 days.

(21) Appl. No.: 14/991,124

(22) Filed: Jan. 8, 2016

(65) Prior Publication Data

US 2016/0267205 A1 Sep. 15, 2016

Related U.S. Application Data

(60) Provisional application No. 62/132,904, filed on Mar. 13, 2015.

(51) Int. Cl.
*G06F 17/50* (2006.01)

(52) U.S. Cl.
CPC ...... *G06F 17/5009* (2013.01); *G06F 17/5036* (2013.01); *G06F 17/5081* (2013.01); *G06F 2217/10* (2013.01)

(58) Field of Classification Search
CPC .. G06F 17/50; G06F 2217/10; G06F 17/5036; G03F 7/705
USPC .......................................................... 716/135
See application file for complete search history.

(56) References Cited

U.S. PATENT DOCUMENTS

| | | | |
|---|---|---|---|
| 6,438,729 B1 | 8/2002 | Ho | |
| 6,721,922 B1 | 4/2004 | Walters et al. | |
| 7,617,470 B1* | 11/2009 | Dehon | G06F 17/5054 |
| | | | 716/116 |
| 8,468,482 B1 | 6/2013 | Pack et al. | |
| 8,606,557 B2 | 12/2013 | Joshi et al. | |
| 8,615,725 B1 | 12/2013 | Keller et al. | |
| 8,645,883 B2 | 2/2014 | Korobkov et al. | |
| 8,863,052 B1 | 10/2014 | Dhuria et al. | |
| 8,869,081 B2 | 10/2014 | Saleh et al. | |
| 8,924,901 B2 | 12/2014 | Mang et al. | |
| 9,009,638 B1* | 4/2015 | Hook | G06F 17/5036 |
| | | | 716/106 |

(Continued)

*Primary Examiner* — Vuthe Siek
*Assistant Examiner* — Aric Lin
(74) *Attorney, Agent, or Firm* — Myers Bigel, P.A.

(57) ABSTRACT

A computer implemented method for determining performance of a semiconductor device is provided. The method includes providing a technology computer aided design data set corresponding to nominal performance of the semiconductor device, identifying a plurality of process variation sources that correspond to process variations that occur during the manufacturing of the semiconductor device, generating a nominal value look-up table of electrical parameters of the semiconductor device using nominal values of each of the plurality of process variation sources, and generating a plurality of process variation look-up tables of electrical parameters of the semiconductor device using variation values corresponding to each of the plurality of process variation sources that are identified as corresponding to the semiconductor device.

16 Claims, 8 Drawing Sheets

(56) References Cited

U.S. PATENT DOCUMENTS

| | | | |
|---|---|---|---|
| 2002/0055193 A1* | 5/2002 | Tsai | G06F 17/5036 438/14 |
| 2003/0188267 A1* | 10/2003 | Lehner | G06F 17/5036 716/113 |
| 2005/0113951 A1* | 5/2005 | Akiyama | G06F 17/5068 700/97 |
| 2008/0133202 A1* | 6/2008 | Tseng | G06F 17/5036 703/14 |
| 2012/0290281 A1* | 11/2012 | Joshi | G06F 17/5022 703/14 |

* cited by examiner

SYSTEMS, METHODS AND COMPUTER PROGRAM PRODUCTS FOR ANALYZING PERFORMANCE OF SEMICONDUCTOR DEVICES

CROSS-REFERENCE TO RELATED APPLICATION

The present application claims priority under 35 U.S.C. § 119 to U.S. Provisional Application Ser. No. 62/132,904, filed on Mar. 13, 2015, the entire content of which is incorporated herein by reference as if set forth in its entirety.

FIELD

The inventive concepts generally relate semiconductor devices and systems methods and computer program products for designing semiconductor devices.

BACKGROUND

There is an increasing demand for semiconductor devices that provide higher and more consistent performance. The design of such devices and systems that include such devices may be accomplished by generating data models of such devices. For example, look-up table (LUT) based modeling methodology may provide a fast turn-around time for generating compact models from TCAD/experimental data without losing accuracy in model fitting. However, the accuracy and thus effectiveness of such models may be influenced by process variations that may be difficult to consider within LUT-based models. In equation-based compact models (e.g., BSIM, PSP), process variations may be captured through a set of model parameters. However, a similar approach cannot be applied to LUT-based models because there are no model parameters in such models. Apparently, the lack of process variation treatment in LUT-based models may limit the application of the LUT-based modeling technology.

SUMMARY

Some embodiments of the present inventive concept are directed to computer implemented methods for analyzing performance of a semiconductor device. Such methods may include providing a technology computer aided design data set corresponding to nominal performance of the semiconductor device, identifying a plurality of process variation sources that correspond to process variations that occur during manufacturing of the semiconductor device, generating a nominal value look-up table of electrical parameters of the semiconductor device using nominal values of each of the plurality of process variation sources, and generating a plurality of process variation look-up tables of electrical parameters of the semiconductor device using variation values corresponding to each of the plurality of process variation sources that are identified as corresponding to the semiconductor device.

In some embodiments, the technology computer aided design data set corresponding to nominal performance of the semiconductor device comprises a technology computer aided design data set corresponding to the semiconductor device without any process variations.

Some embodiments provide that the technology computer aided design data set corresponding to nominal performance of the semiconductor device is based on experimental data corresponding to electrical current and voltage curves for the semiconductor device at substantially all cases of expected performance.

In some embodiments, generating the plurality of process variation look-up tables of electrical parameters of the semiconductor device using variation values corresponding to each of the plurality of process variation sources that are identified as corresponding to the semiconductor device comprises, for each process variation source of the plurality of process variation sources, generating a statistical distribution of process variation values that range from the nominal value of the process variation to a process variation limit, and calculating a plurality of dependence values corresponding to the process variation values.

Some embodiments provide that generating the statistical distribution comprises generating a Gaussian distribution of process variation values that ranges from a given negative number of standard deviations to a given positive number of standard deviations, with the mean of the Gaussian distribution equal to zero, which corresponds to the nominal case (no process variations).

In some embodiments, calculating the plurality of dependence values comprises calculating a linear dependence value that corresponds to a linear dependence of electrical current in the semiconductor device on a threshold voltage of the semiconductor device and calculating an exponential dependence value that corresponds to an exponential dependence of electrical current in the semiconductor device on a threshold voltage of the semiconductor device.

Some embodiments provide that the linear dependence value is determined using nominal current ($I_{d0}$), electrical current values in a corresponding one of the plurality of look-up tables ($I_{di}$), and values in an array including Gaussian distribution $\Delta P_i$ according to an equation:

$$I_d(lin) = I_{d0} \cdot \left(1 + \sum_{i=1}^{NP} \frac{I_{di} - I_{d0}}{I_{d0}} \cdot \frac{|\Delta P_i|}{3}\right).$$

In some embodiments, the exponential dependence value is determined using nominal current ($I_{d0}$), electrical current values in a corresponding one of the plurality of process variation look-up tables ($I_{di}$), and values in an array including a Gaussian distribution $\Delta P_i$ according to an equation:

$$I_d(exp) = I_{d0} \cdot \prod_{i=1}^{NP} \left(\frac{I_{di}}{I_{d0}}\right)^{\frac{|\Delta P_i|}{3}}$$

$$I_{di} = \begin{cases} I_d|_{P_i@-3\sigma} & \text{when } \Delta P_i \geq 0 \\ I_d|_{P_i@-3\sigma} & \text{when } \Delta P_i < 0 \end{cases}.$$

Some embodiments include calculating a bias-dependent coefficient that is extracted from a nominal current-voltage curve. In some embodiments, calculating the bias-dependent coefficient comprises calculating positive current dependence ($I_d(plus)$) and negative current dependence ($I_d(Minus)$) using values from the nominal value lookup table, wherein $I_d(plus)=Id(Vgs=Vgs0-\Delta Vt, Vds=Vds0)$; and $I_d(minus)=Id(Vgs=Vgs0+\Delta Vt, Vds=Vds0)$.

Some embodiments include using the positive current dependence ($I_d(plus)$) and negative current dependence ($I_d$ (Minus)) to generate an arithmetic average of $I_d$ ($I_d$(ave1)) and a geometrical average of $I_d$ ($I_d$(ave2)). In some embodiments, the bias-dependent coefficient is calculated as $$\eta = \frac{I_{d0} - I_d(ave2)}{I_d(ave1) - I_d(ave2)}.$$

Some embodiments include calculating electrical current $I_d$ as $$I_d = \eta \cdot I_d(\text{lin}) + (1-\eta) \cdot I_d(\exp).$$

Some embodiments include using a damping factor β to calculate electrical current $I_d$ as $$I_d = \beta \cdot \eta \cdot I_d(\text{lin}) + (1-\beta \cdot \eta) \cdot I_d(\exp).$$

In some embodiments, providing a technology computer aided design data set corresponding to nominal performance of the semiconductor device comprises receiving performance data corresponding to the semiconductor device.

Some embodiments provide that the semiconductor device comprises a MOSFET, a TFET or other type of field effect transistors.

Some embodiments include building a Verilog-A based model of the semiconductor device using the nominal value look-up table and the plurality of process variation look-up tables, wherein the Verilog-A based model is configured to calculate current and capacitance values at a given voltage bias point based on process variations. In some embodiments, the Verilog-A based model is further configured to generate smooth current-voltage and capacitance-voltage curves in a full operating range of the semiconductor device. Some embodiments provide that the Verilog-A based model of the semiconductor device uses the nominal value look-up table, one of the plurality of process variation look-up tables corresponding to a positive number of standard deviations for each of the identified process variations and one of the plurality of process variation look-up tables corresponding to a negative number of standard deviations for each of the identified process variations.

Some embodiments of the present inventive concept are directed to systems for analyzing performance of a semiconductor device. Such systems may include a processor, a memory that stores computer readable code that, when executed, causes the processor to perform the operations disclosed herein.

Some embodiments of the present inventive concept are directed to computer program products that include a non-transitory computer readable storage medium storing computer readable program code that, when executed by a processor of an electronic device, causes the processor to perform operations disclosed herein. Examples of such operations may include providing a technology computer aided design data set corresponding to nominal performance of a semiconductor device, identifying a plurality of process variation sources that correspond to process variations that occur during manufacturing of the semiconductor device, generating a nominal value look-up table of semiconductor performance of the semiconductor device using nominal values of each of the plurality of process variation sources, generating a plurality of process variation look-up tables of semiconductor performance of the semiconductor device using variation values corresponding to each of the plurality of process variation sources that are identified as corresponding to the semiconductor device, generating a Verilog-A based model of the semiconductor using the nominal value look-up table and the plurality of process variation look-up tables, and calculating a bias-dependent coefficient that is extracted from a nominal current-voltage curve using positive current dependence ($I_d$(plus)) and negative current dependence ($I_d$(Minus)) to generate an arithmetic average of $I_d$ ($I_d$(ave1)) and a geometrical average of $I_d$ ($I_d$(ave2)).

It is noted that aspects of the inventive concepts described with respect to one embodiment, may be incorporated in a different embodiment although not specifically described relative thereto. That is, all embodiments and/or features of any embodiment can be combined in any way and/or combination. These and other objects and/or aspects of the present inventive concepts are explained in detail in the specification set forth below.

DETAILED DESCRIPTION

Pursuant to embodiments of the inventive concepts, disclosed herein is a practical approach to accurately model process variations in a LUT-based model library. By way of example, a fully automated flow is developed for building Verilog-A based model libraries using LUTs generated from technology computer aided design (TCAD) data. In this regard, circuit Monte-Carlo (MC) simulations with multiple Process Variation (PV) sources become feasible, which may be critical for comprehensive performance benchmark of modeled devices.

Some embodiments herein may provide a generic approach for introducing process variations (e.g., die-to-die, wafer-to-wafer) into lookup-table-based, FET compact models. Examples of outputs of such models have been verified with TCAD simulation results for both conventional MOSFETs and Tunnel FETs. In this manner, circuit-level analysis of new transistors may be performed with the consideration of various process variation sources.

In summary, a number of process variation sources ($P_i$, i=1, ..., NP) are identified. TCAD simulations are performed by varying one PV source to its +3σ or −3σ value at a time. The 2·NP+1 LUTs generated from the TCAD data (two LUTs for each PV and one for the nominal case) may be used to generate a model of the device. For example, some embodiments provide that a Verilog-A model may be generated, however, such embodiments are non-limiting. Some embodiments provide that an MC simulation may be performed by applying a Gaussian distribution to each process variation source. In this manner, for each MC instance, an array, $\Delta P_i$ (i=1, ..., NP), may be passed to the Verilog-A model as instance parameters. Some embodiments provide that for each bias point, the following two quantities are calculated, $$I_d(lin) = I_{d0} \cdot \left(1 + \sum_{i=1}^{NP} \frac{I_{di} - I_{d0}}{I_{d0}} \cdot \frac{|\Delta P_i|}{3}\right)$$

$$I_d(exp) = I_{d0} \cdot \prod_{i=1}^{NP} \left(\frac{I_{di}}{I_{d0}}\right)^{\frac{|\Delta P_i|}{3}},$$

where $I_{d0}$ is the nominal current and $I_{di}$ is the current when $P_i$ is at +3σ (−3σ) if $\Delta P_i \geq 0$ ($\Delta P_i < 0$). ($\Delta P_i$ is in numbers of σ.) Finally, the current for this bias point is computed as, $$I_d = \eta \cdot I_d(lin) + (1-\eta) \cdot I_d(exp),$$

where η is a bias-dependent coefficient extracted from the nominal I-V curve. (The calculation of C-V values is the same as the I-V case.)

Figure 1:
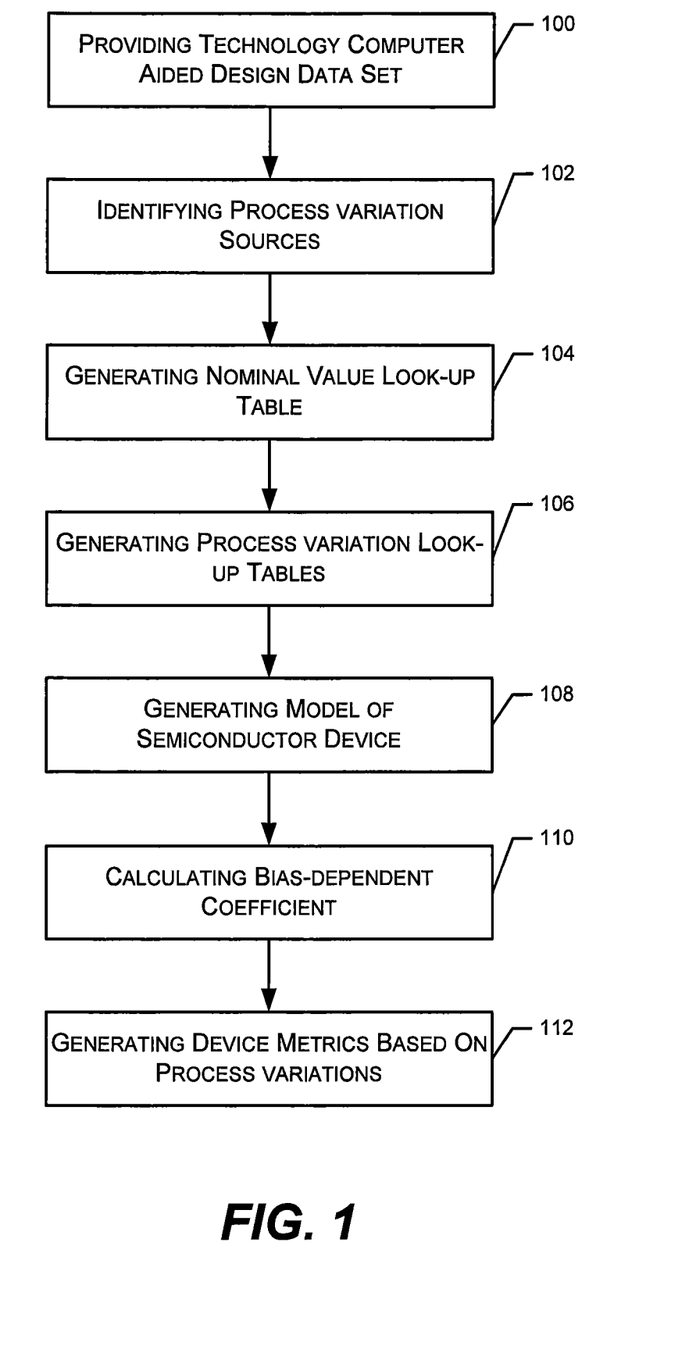
FIG. 1 is a block diagram that illustrates operations in methods and computer program products according to some embodiments of the present inventive concepts.

Reference is now made to FIG. 1, which is a block diagram that illustrates operations in methods and computer program products according to some embodiments of the present inventive concepts. Operations may include providing a technology computer aided design (TCAD) data set corresponding to nominal performance of a semiconductor device (block 100). In some embodiments, the semiconductor device may include, for example, a metal-oxide-semiconductor field effect transistor (MOSFET) or a tunnel field-effect transistor (TFET). The methods, systems and computer program products herein may be applied to other types of devices. Some embodiments provide that the TCAD data set, also referred to as the output of a TCAD deck, may be well-calibrated using test and/or manufacturing data from one or more sources. Such sources may include manufacturing databases, measurement tools and/or other diagnostic devices, such as a device analyzer that may provide nominal device characteristics based on significantly sized sample sets of semiconductor devices. In some embodiments, the TCAD deck corresponding to nominal performance of the semiconductor device is based on experimental data corresponding to electrical current and voltage curves for the semiconductor at substantially all cases of expected performance.

Operations may include identifying a plurality of process variation sources that correspond to process variations that occur during the manufacturing of the semiconductor device (block 102). Non-limiting examples of process variations may include gate oxide thickness, doping concentrations, and gate length among others. Identifying the process variation sources may be performed using statistical, measured and/or manufacturing data that identifies which aspects of the manufacturing process are subject to the greatest variations and/or the process variations to which the characteristics of the semiconductor device are most sensitive. For example, semiconductor device characteristics may be significantly more sensitive to some process variations relative to other process variations.

A nominal value look-up table (LUT) may be generated (block 104). The nominal value LUT provides data corresponding to all of the process variation sources being at their nominal value. The LUT data may include current and capacitance values at each given voltage bias point among others.

Multiple LUTs may be generated corresponding to the multiple process variation sources that are identified (block 106). Generating the multiple process variation LUTs may include generating two LUTs for each of the process variation sources. In some embodiments, LUTs may be generated for a variation value at some integer times the standard deviation of the process variation. Some embodiments provide that a statistical distribution of process variation values that range from the nominal value of the process variation to a process variation limit may be generated. Some embodiments include generating a Gaussian distribution of process variation values that ranges from a given negative number of standard deviations to a given positive number of standard deviations, with the mean of the Gaussian distribution equal to zero, which corresponds to the nominal case (no process variations). Some embodiments provide that an example of a process variation limit may include a positive or negative integer of the standard deviation of the process variation.

In some embodiments, a pair of LUTs may be generated for each process variation source at the nominal value plus and minus three times the standard deviation of the process variation value. In this regard, the total number of LUTs may be two times the number of process variation sources plus one more LUT for the nominal value.

Some embodiments provide that a LUT-based model of the semiconductor device may be generated in a hardware descriptor language (HDL) (block 108). As described herein, the LUT-based model may be generated in the HDL Verilog-A, but such embodiments are merely non-limiting examples of a suitable HDL.

A plurality of dependence values corresponding to the process variation values may be calculated. For example, a linear dependence value that corresponds to the linear dependence of electrical current in the semiconductor device on a threshold voltage of the semiconductor may be calculated. Some embodiments provide that the linear dependence value may be calculated using the nominal current ($I_{d0}$), the electrical current values with one process variation source ($I_{di}$), and values in an array including the Gaussian distribution $\Delta P_i$ according to the following equation:

$$I_d(lin) = I_{d0} \cdot \left(1 + \sum_{i=1}^{NP} \frac{I_{di} - I_{d0}}{I_{d0}} \cdot \frac{|\Delta P_i|}{3}\right).$$

In some embodiments, an exponential dependence value that corresponds to the exponential dependence of electrical current in the semiconductor device on a threshold voltage of the semiconductor may be calculated. Some embodiments provide that the exponential dependence value is determined using the nominal current ($I_{d0}$), the electrical current values with one process variation source ($I_{di}$), and values in an array including the Gaussian distribution $\Delta P_i$ according to an equation:

$$I_d(\exp) = I_{d0} \cdot \sum_{i=1}^{NP} \left(\frac{I_{di}}{I_{d0}}\right)^{\frac{|\Delta P_i|}{3}}$$

$$I_d = \begin{cases} I_d |_{P_i@-3\sigma} & \text{when } \Delta P_i \geq 0 \\ I_d |_{P_i@-3\sigma} & \text{when } \Delta P_i < 0 \end{cases}.$$

Some embodiments further include calculating a bias-dependent coefficient that is extracted from a nominal current-voltage curve (block 110). Some embodiments provide that the bias-dependent coefficient may be calculated by determining positive current dependence ($I_d$(plus)) and negative current dependence ($I_d$(Minus)) using values from the lookup table. For example, $I_d$(Plus) and $I_d$(Minus) may be determined using the following equations based on values that may be determined from the LUTs.

$$I_d(\text{plus}) = Id(Vgs = Vgs0 - \Delta Vt, Vds = Vds0);$$

$$I_d(\text{minus}) = Id(Vgs = Vgs0 + \Delta Vt, Vds = Vds0).$$

Additionally, some embodiments include calculating an arithmetic average of $I_d$ ($I_d$(ave1)) and a geometrical average of $I_d$ ($I_d$(ave2) according to the following example equations:

$$I_d(\text{ave1}) = [I_d(\text{Plus}) + I_d(\text{Minus})]/2;$$

$$I_d(\text{ave2}) = [I_d(\text{Plus}) * I_d(\text{Minus})]^{-0.5}.$$

Some embodiments provide that the bias-dependent coefficient ($\eta$) may be calculated using the nominal current $I_{d0}$, the arithmetic average $I_d$(ave1) and the geometric average $I_d$(ave2) using, for example, the equation:

$$\eta = \frac{I_{d0} - I_d(\text{ave2})}{I_d(\text{ave1}) - I_d(\text{ave2})}.$$

As the value of the bias-dependent coefficient $\eta$ approaches zero, the current will have a more exponential dependence on the threshold voltage ($V_{th}$), which corresponds to the sub-threshold regime. In contrast, as the value of the bias-dependent coefficient $\eta$ approaches one, the current will have a more linear dependence on the threshold voltage $V_{th}$, which corresponds to the super-threshold regime.

Device metrics, such as $I_d$, may be generated based on the process variations (block 112). For example, the electrical current $I_d$ may be calculated as:

$$I_d = \eta \cdot I_d(\text{lin}) + (1 - \eta) \cdot I_d(\exp).$$

In some embodiments, a damping factor $\beta$ may be used to smooth the curve using the equation:

$$I_d = \beta \cdot \eta \cdot I_d(\text{lin}) + (1 - \beta \cdot \eta) \cdot I_d(\exp).$$

Some embodiments provide that $\beta$ may be a value between 0 and 1 with higher values providing less damping and lower values providing more damping. In some embodiments, $\beta$ may be, for example, 0.6, however such embodiments are non-limiting examples.

As provided herein, the LUT-based model may generate smooth current-voltage and capacitance-voltage curves in a full operating range of the semiconductor device. In some embodiments, the Verilog-A based model of the semiconductor device uses the nominal value look-up table, a process variation look-up table corresponding to a positive number of standard deviations for each of the identified process variations and a process variation look-up table corresponding to a negative number of standard deviations for each of the identified process variations.

Figure 2:
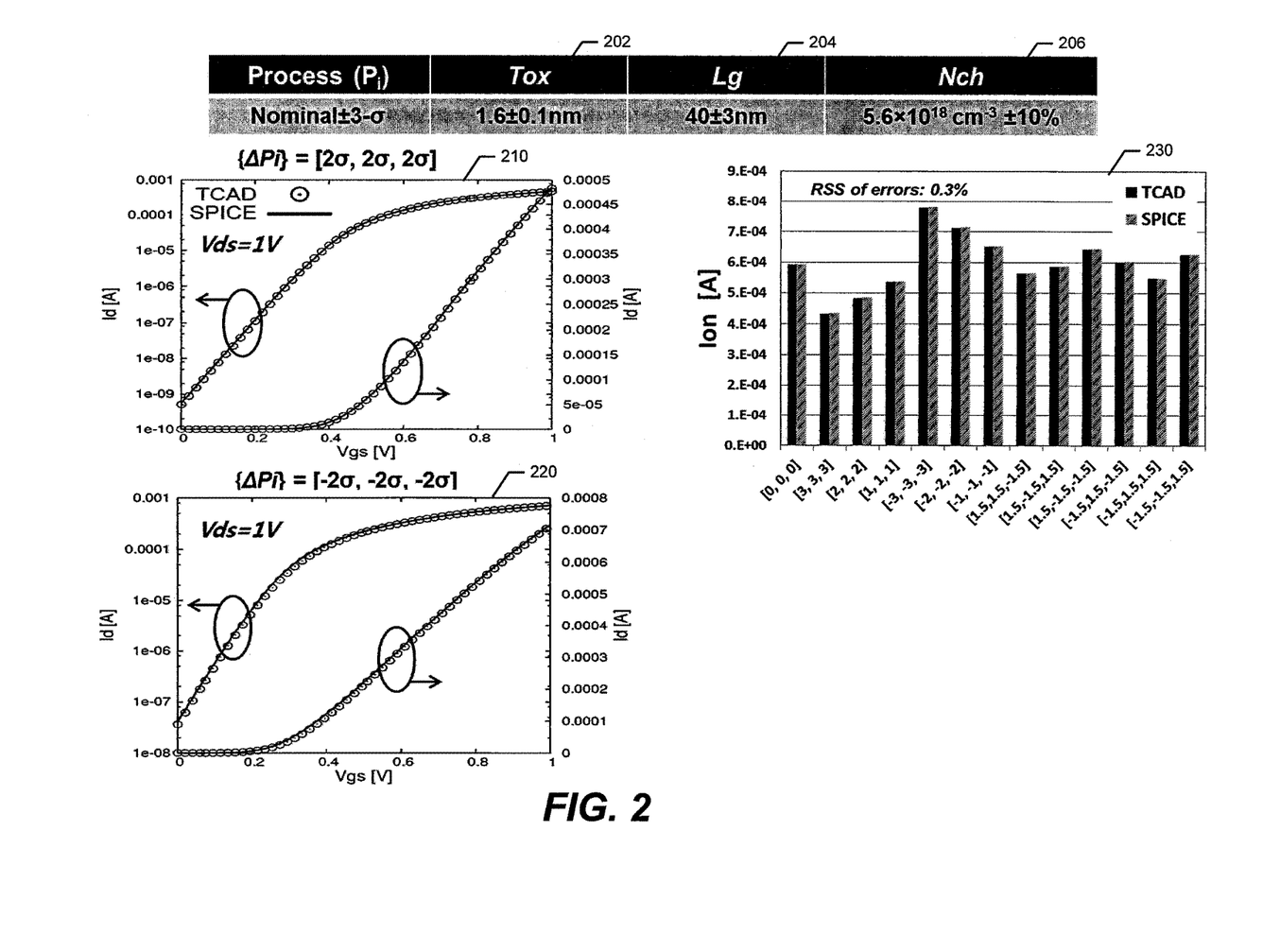
FIG. 2 includes $I_d$-$V_g$ curves and ON-current bar graphs that are generated from compact (SPICE) models and TCAD simulations and various process variation corners for an n-type MOSFET, according to some embodiments of the present inventive concepts.

Reference is now made to FIG. 2, which includes $I_d$-$V_g$ curves and ON-current bar graphs that are generated from compact (SPICE) models and TCAD simulations and various process variation corners for an n-type MOSFET at a Vdd value of 1 Volt, according to some embodiments of the present inventive concepts. The curves and bar graph correspond to identified process variations Pi of oxide gate thickness (Tox) 202, gate length (Lg) 204, and N-channel doping concentration (Nch) 206.

The plot 210 includes TCAD simulation and SPICE curves plotting $I_d$-$V_g$ when the process variations $\Delta Pi$ are at positive two standard deviations ($+2\alpha$) from their respective nominal values. Similarly, the plot 220 includes TCAD simulation and SPICE curves plotting $I_d$-$V_g$ when the process variations $\Delta Pi$ are at negative two standard deviations ($-2\sigma$) from their respective nominal values. Note that smooth $I_d$-$V_g$ curves are obtained in the full dynamic bias range and that excellent match between the compact (SPICE) model and TCAD is achieved at various process corners.

Further, the bar graph 230 illustrates the ON-current of TCAD and compact (SPICE) model results for the n-type MOSFET with various process variation combinations. As illustrated, the x-axis identified the process variation value combination in terms of the quantity of standard deviations a. For example, the process variation nominal value combination is [0, 0, 0]. Note that the root-sum-square of errors is 0.3% between the TCAD results and the compact (SPICE) model results.

Figure 3:
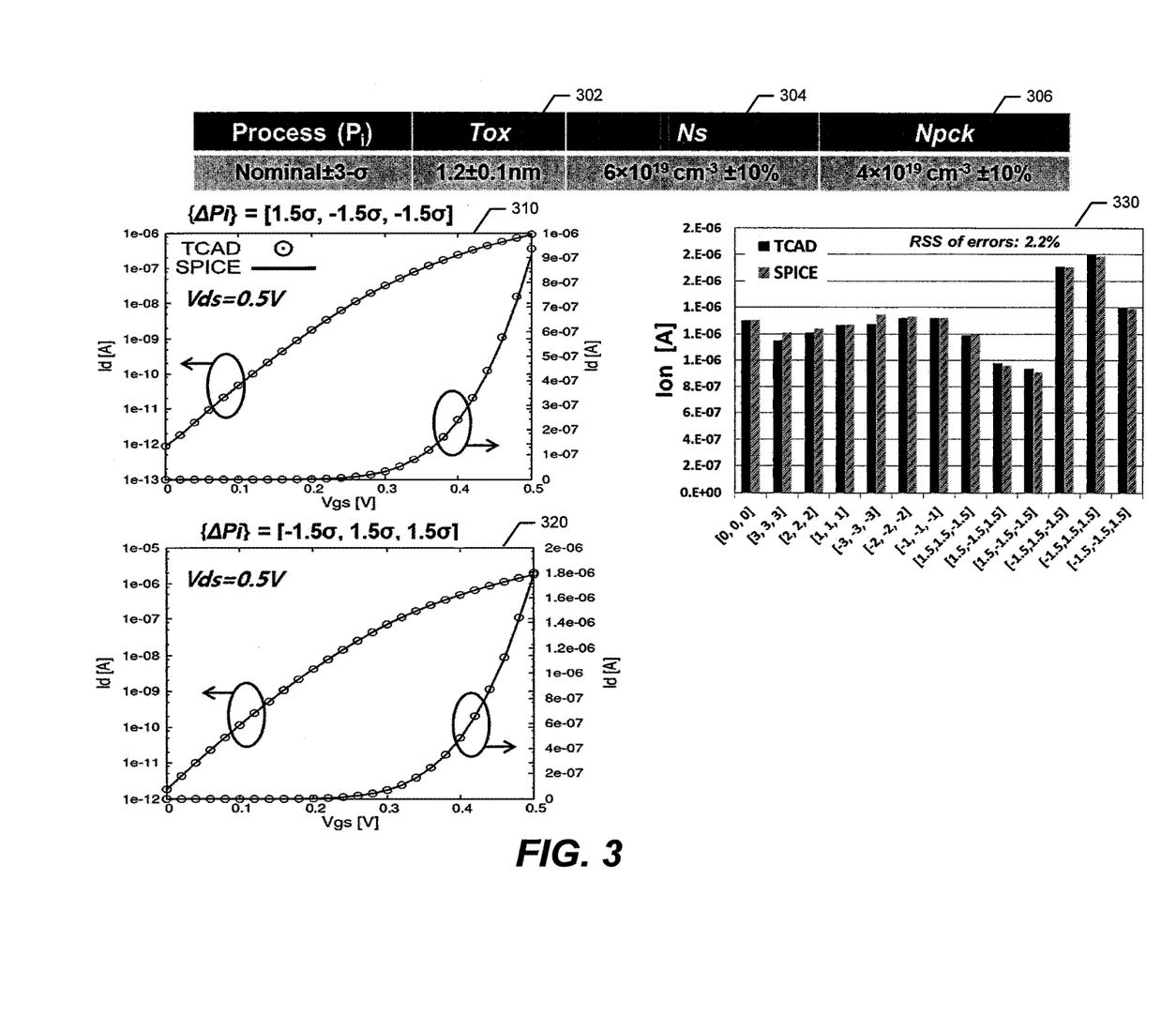
FIG. 3 includes $I_d$-$V_g$ curves and ON-current bar graphs that are generated from compact (SPICE) models and TCAD simulations and various process variation corners for a Tunnel FET (TFET), according to some embodiments of the present inventive concepts.

Reference is now made to FIG. 3, which includes $I_d$-$V_g$ curves and ON-current bar graphs that are generated from compact (SPICE) models and TCAD simulations and various process variation corners for a TFET at a Vdd value of 0.5 Volt, according to some embodiments of the present inventive concepts. The curves and bar graph correspond to identified process variations Pi of oxide gate thickness (Tox) 302, source doping concentration (Ns) 304, and n+ pocket doping concentration (Npcl) 306.

The plot 310 includes TCAD simulation and SPICE curves plotting $I_d$-$V_g$ when the process variations $\Delta Pi$ for Tox 302 is at positive 1.5 standard deviations ($+1.5\sigma$), Ns 304 is at negative 1.5 standard deviations ($-1.5\sigma$), and Npck 306 is at negative 1.5 standard deviations ($-1.5\sigma$), from their respective nominal values. Similarly, the plot 320 includes TCAD simulation and SPICE curves plotting $I_d$-$V_g$ when the process variations $\Delta Pi$ for Tox 302 is at negative 1.5 standard deviations ($-1.5\sigma$), Ns 304 is at positive 1.5 standard deviations ($+1.5\sigma$), and Npck 306 is at positive 1.5 standard deviations ($+1.5\sigma$), from their respective nominal values. Note that smooth $I_d$-$V_g$ curves are obtained in the full dynamic bias range and that excellent match between the compact (SPICE) model and TCAD is achieved at various process corners. Additionally, as illustrated in the relevant portions of FIGS. 2 and 3, the statistical distributions generated from the LUT-based model library provide good representations of those from TCAD simulations.

Further, the bar graph 330 illustrates the ON current of TCAD and compact (SPICE) model results for the TFET with various process variation combinations. As illustrated, the x-axis identified the process variation value combination in terms of the quantity of standard deviations a. For example, the process variation nominal value combination is [0, 0, 0]. Note that the root-sum-square of errors is 2.2% between the TCAD results and the compact model (SPICE) results. As such, the LUT-based model library is shown to work well for both MOSFET and TFET semiconductor devices.

Figure 4:
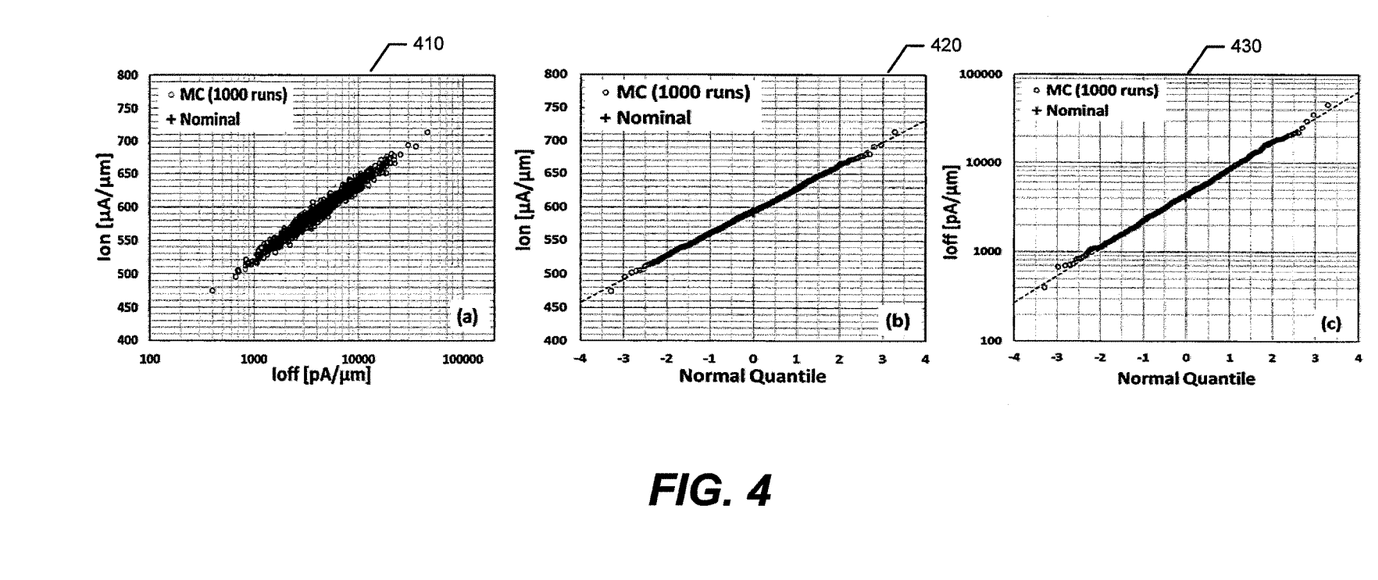
FIG. 4 includes plots of Monte Carlo simulations of ON current-OFF current, ON current-Normal Quantile and OFF current-Normal Quantile that are generated using methods described herein for a MOSFET, according to some embodiments of the present inventive concepts.

Reference is now made to FIG. 4, which includes plots of Monte Carlo simulations of ON current-OFF current 410, ON current-Normal Quantile 420 and OFF current-Normal Quantile 430, that are generated using methods described herein for a MOSFET at a Vdd value of 1 Volt, according to some embodiments of the present inventive concepts. As illustrated, the distributions of the MonteCarlo simulation data demonstrate that device variation specifications may be extracted and worst case circuit metrics may be estimated with the consideration of process variations in the LUT-based model.

Figure 5:
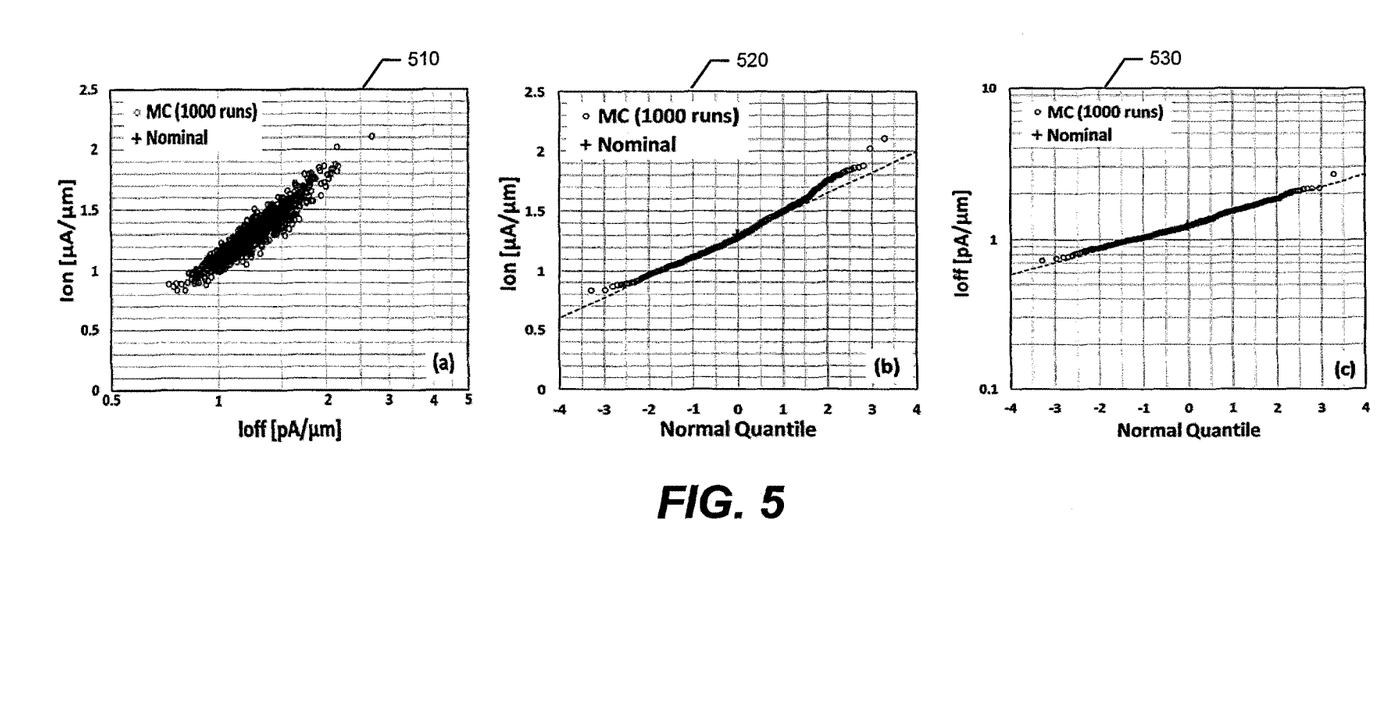
FIG. 5 includes plots of Monte Carlo simulations of ON current-OFF current, ON current-Normal Quantile and OFF current-Normal Quantile that are generated using methods described herein for a TFET, according to some embodiments of the present inventive concepts.

Reference is now made to FIG. 5, which includes plots of Monte Carlo simulations of ON current-OFF current 510, ON current-Normal Quantile 52Q and OFF current-Normal Quantile 530, that are generated using methods described herein for a TFET at a Vdd value of 0.5 Volts, according to some embodiments of the present inventive concepts. As illustrated, the distributions of the MonteCarlo simulation data demonstrate that device variation specifications may be extracted and worst case circuit metrics may be estimated with the consideration of process variations in the LUT-based model.

Figure 6:
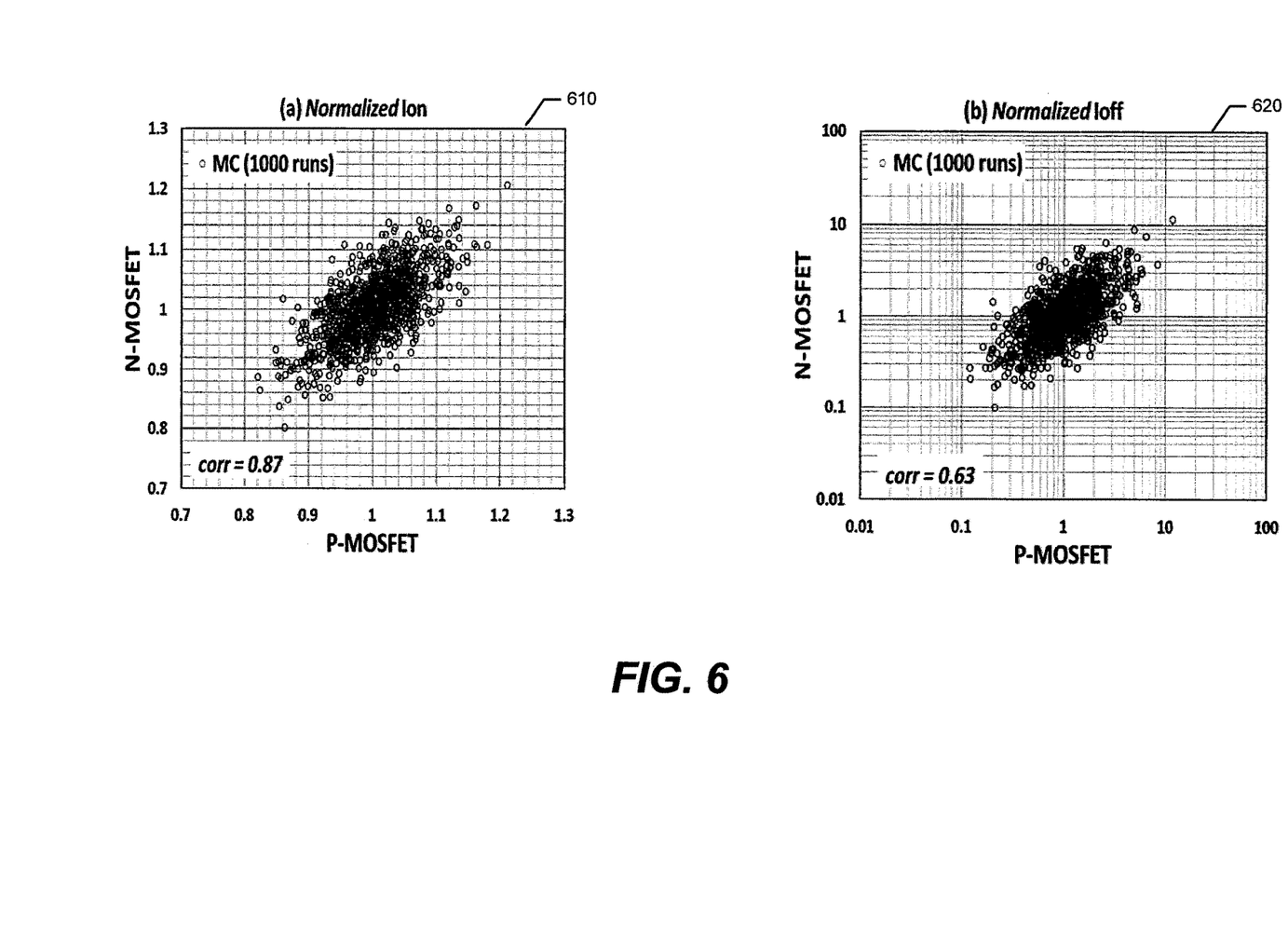
FIG. 6 includes plots of Monte Carlo simulations of normalized ON current of N-MOSFET vs. P-MOSFET and of normalized OFF current of N-MOSFET vs. P-MOSFET according to some embodiments of the present inventive concepts.

Additionally, proper modeling of variability correlations among different device types (e.g., nFET vs. pFET) may be critical for accurate circuit simulation and benchmarking. In this manner, according to methods herein, each process variation source may be explicitly treated as an instance parameter. As such, variability correlations may be captured in a fundamental way. For example, reference is now made to FIG. 6, which includes plots of Monte Carlo simulations of normalized ON current of N-MOSFET vs. P-MOSFET 610 and of normalized OFF current of N-MOSFET vs. P-MOSFET 620 according to some embodiments of the present inventive concepts. The devices used in this simulation share the same ΔTox and ΔLg, but have different ΔNch values. In each of the illustrated cases, the N-MOSFET and the P-MOSFET are partially correlated, namely, 0<Correlation<1. For example, the N-MOSFET and the P-MOSFET have a correlation of 0.87 for the ON current and a correlation of 0.63 for the OFF current.

Figure 7:
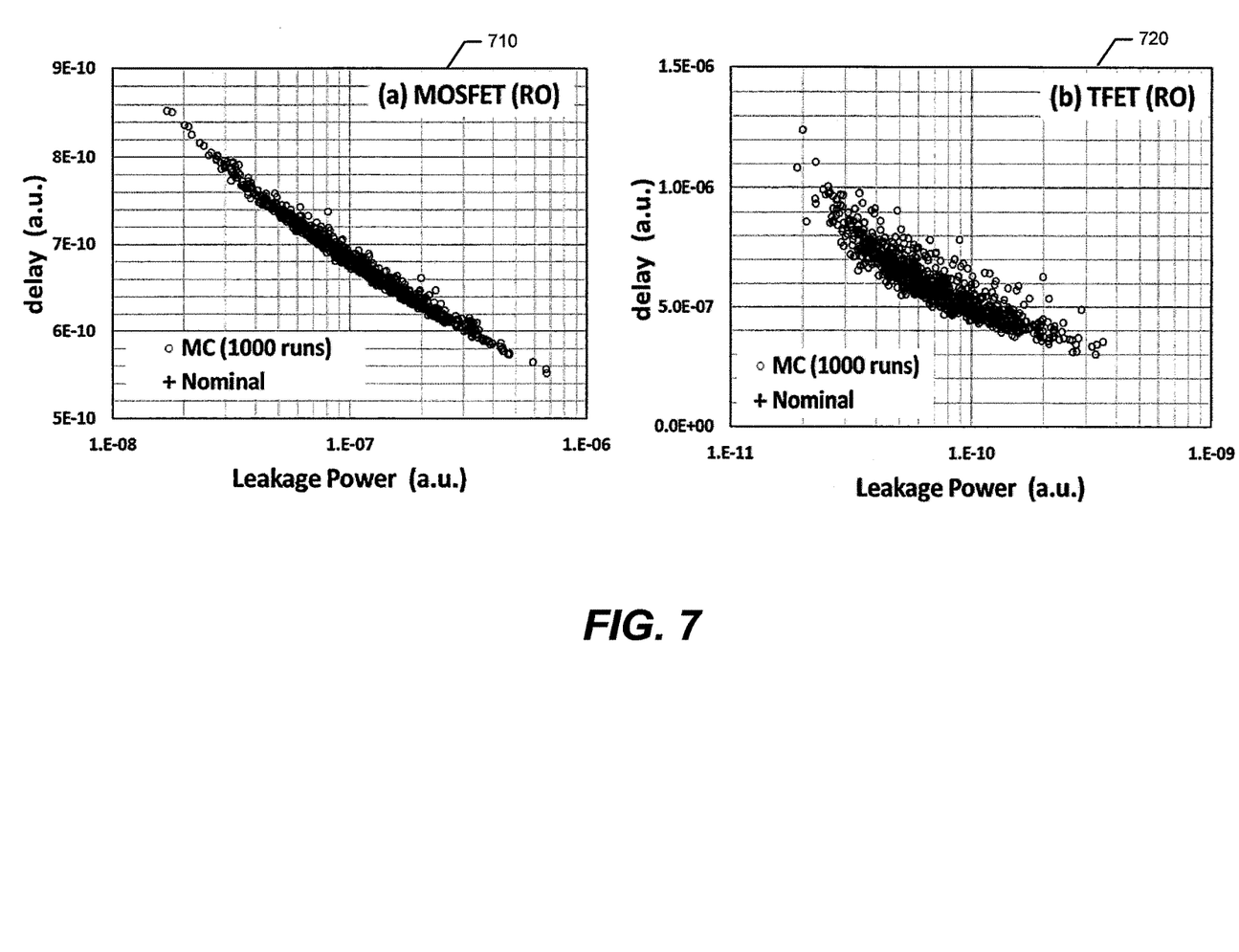
FIG. 7 includes plots of Monte Carlo simulations of delay vs. leakage power of a MOSFET ring oscillator and of a TFET ring oscillator according to some embodiments of the present inventive concepts.

Reference is now made to FIG. 7, which includes plots of Monte Carlo simulations of delay vs. leakage power of a MOSFET ring oscillator 710 and of a TFET ring oscillator 720 according to some embodiments of the present inventive concepts. Using the Monte Carlo simulation data of the ring oscillators, worst case circuit metrics (e.g., delay, power consumptions) may be extracted. Such metrics may be critical for performance benchmarks corresponding to different device options. In each of the illustrated cases, the N-MOSFET and the P-MOSFET are partially correlated, namely, 0<Correlation<1. For example, the N-MOSFET and the P-MOSFET have a correlation of 0.87 for the ON current and a correlation of 0.63 for the OFF current.

Figure 8:
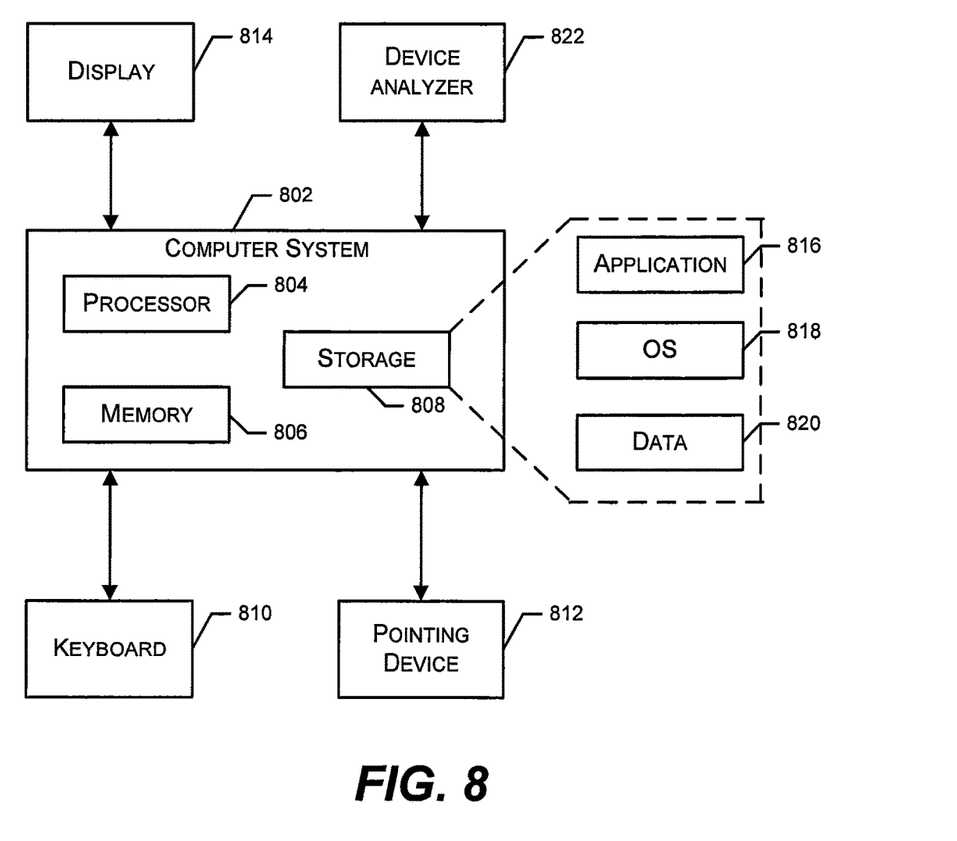
FIG. 8 illustrates a computer system in accordance with some embodiments of the present inventive concepts.

Reference is now made to FIG. 8, which illustrates a computer system in accordance with some embodiments described herein. A computer or a computer system can generally be any system that can perform computations. Specifically, a computer system can be a microprocessor, an application specific integrated circuit, a distributed computing system, a cloud computing system, or any other computing system now known or later developed. In some embodiments, computer system 802 includes processor 804, memory 806, and storage 808. Computer system 802 can be coupled with display 814, keyboard 810, pointing device 812, and device analyzer 822. Storage 808 can generally be any device that can store data. Specifically, a storage device can be a magnetic, an optical, and/or a magneto-optical storage device, and/or it can be based on flash memory and/or battery-backed up memory. Storage 808 can store application 816, operating system 818, and data 820. Application 816 can include instructions that when executed by computer 802 cause computer 802 to perform one or more processes that are implicitly or explicitly described in this disclosure. Data 820 can include any data that is inputted into or outputted by application 816. For example, the data 820 may include a technology computer aided design data set corresponding to nominal performance of a semiconductor device. In some embodiments, such data is received from a device analyzer 822.

As shown above, embodiments disclosed herein may provide computational efficiency over conventional methods of analyzing and/or designing semiconductor devices and/or electrical circuits including semiconductor devices by providing a LUT-based model for considering process variations. Where previous methodologies provided impractically complex approaches to capturing process variations, embodiments herein provide significant increases in computational efficiency by providing LUT-based technology to consider process variations.

Embodiments of the inventive concepts have been described above with reference to the accompanying drawings, in which example embodiments are shown. The inventive concepts may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout the drawings and specification. As used herein the expression "and/or" includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

It will be understood that when an element is referred to as being "coupled to" or "connected to" or "on" another element, it can be directly coupled to, connected to or on the other element or intervening elements may also be present. In contrast, when an element is referred to as being "directly coupled to" or "directly connected to" or "directly on" another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, elements, and/or components, but do not preclude the presence or addition of one or more other features, elements, components, and/or groups thereof.

Various embodiments of the present invention are described above with reference to block diagrams illustrating methods, apparatus and computer program products according to various embodiments of the invention. It will be understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational illustrations. Accordingly, it will be appreciated that the block diagrams and operational illustrations support apparatus, methods and computer program products.

It will be further appreciated that the functionality described herein may be embodied, at least in part, using discrete hardware components, one or more Application Specific Integrated Circuits (ASIC) and/or one or more special purpose digital processors and/or computers.

All embodiments can be combined in any way and/or combination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

What is claimed is:

1. A computer implemented method for manufacturing of a second instance of a semiconductor device, the method comprising:
    manufacturing a first instance of the semiconductor device;
    providing a technology computer aided design data set corresponding to nominal performance of the first instance of the semiconductor device based on manufacturing data from manufacturing the first instance of the semiconductor device;
    identifying a plurality of process variations that occurred during manufacturing of the first instance of the semiconductor device;
    generating a nominal value look-up table comprising electrical parameters of the first instance of the semiconductor device corresponding to nominal values of each of the plurality of process variations; and
    generating a plurality of process variation look-up tables of electrical parameters of the first instance of the semiconductor device using variation values corresponding to each of the plurality of process variations that were identified by performing operations comprising:
        generating a statistical distribution of process variation values that range from the nominal value of the process variation to a process variation limit;
        calculating a linear dependence value that corresponds to a linear dependence of electrical current in the first instance of the semiconductor device on a threshold voltage of the first instance of the semiconductor device; and
        calculating an exponential dependence value that corresponds to an exponential dependence of electrical current in the first instance of the semiconductor device on a threshold voltage of the first instance of the semiconductor device;
    building a Hardware Description Language (HDL) model of the first instance of the semiconductor device using the nominal value look-up table and the plurality of process variation look-up tables; and
    manufacturing the second instance of the semiconductor device based on the HDL model,
    wherein the linear dependence value ($I_d(lin)$) is determined using a nominal current ($I_{d0}$) value and electrical current values in a corresponding one of the plurality of process variation look-up tables ($I_{di}$), number of process variation sources (NP), and values in an array including a first Gaussian distribution $\Delta P_i$ according to equation:

$$I_d(lin) = I_{d0} \cdot \left(1 + \sum_{i=1}^{NP} \frac{I_{di} - I_{d0}}{I_{d0}} \cdot \frac{|\Delta P_i|}{3}\right),$$

and
    wherein the exponential dependence value ($I_d(exp)$) is determined using the nominal current ($I_{d0}$) and the electrical current values in the corresponding one of the plurality of process variation look-up tables ($I_{di}$), number of process variation sources (NP), and values in an array including a second Gaussian distribution $\Delta P_i$ according to equation:

$$I_d(exp) = I_{d0} \cdot \prod_{i=1}^{NP} \left(\frac{I_{di}}{I_{d0}}\right)^{\frac{|\Delta P_i|}{3}}$$

$$I_d = \begin{cases} I_d \mid_{P_i @ -3\sigma} & \text{when } \Delta P_i \geq 0 \\ I_d \mid_{P_i @ -3\sigma} & \text{when } \Delta P_i < 0 \end{cases}.$$

2. The computer implemented method according to claim 1,
    wherein the technology computer aided design data set corresponding to nominal performance of the first instance of the semiconductor device comprises a technology computer aided design data set corresponding to the first instance of the semiconductor device without any process variations.

3. The computer implemented method according to claim 1, wherein the technology computer aided design data set corresponding to nominal performance of the first instance of the semiconductor device is based on experimental data corresponding to electrical current and voltage curves for the first instance of the semiconductor device at substantially all cases of expected performance.

4. The computer implemented method according to claim 1, wherein generating the statistical distribution comprises:

generating a Gaussian distribution of process variation values that ranges from a given negative number of standard deviations to a given positive number of standard deviations, with the mean of the Gaussian distribution equal to zero, which corresponds to the nominal case without process variations.

5. The computer implemented method according to claim 1, wherein providing a technology computer aided design data set corresponding to nominal performance of the first instance of the semiconductor device comprises receiving performance data corresponding to the first instance of the semiconductor device.

6. The computer implemented method according to claim 1, wherein the first instance of the semiconductor device comprises a MOSFET, a TFET or other type of field effect transistors.

7. A system for analyzing performance of a first instance of a semiconductor device, the system comprising:
  a processor; and
  a memory that stores computer readable code that, when executed, causes the processor to perform the operations of claim 1.

8. The computer implemented method according to claim 1, wherein the HDL model comprises a Verilog-A based model.

9. A computer implemented method for manufacturing of a second instance of a semiconductor device, the method comprising:
  manufacturing a first instance of the semiconductor device;
  providing a technology computer aided design data set corresponding to nominal performance of the first instance of the semiconductor device based on manufacturing data from manufacturing the first instance of the semiconductor device;
  identifying a plurality of process variations that occurred during manufacturing of the first instance of the semiconductor device;
  generating a nominal value look-up table comprising electrical parameters of the first instance of the semiconductor device corresponding to nominal values of each of the plurality of process variations; and
  generating a plurality of process variation look-up tables of electrical parameters of the first instance of the semiconductor device using variation values corresponding to each of the plurality of process variations that were identified by performing operations comprising:
    generating a statistical distribution of process variation values that range from the nominal value of the process variation to a process variation limit;
    calculating a plurality of dependence values corresponding to the process variation values; and
    calculating a bias-dependent coefficient that is extracted from a nominal current-voltage curve as $$\eta = \frac{I_{d0} - I_d(ave2)}{I_d(ave1) - I_d(ave2)},$$

wherein $I_{d0}$ comprises the nominal current, $I_d(ave1)$, comprises a arithmetic average, and $I_d(ave2)$ comprises a geometric average;
  building a Hardware Description Language (HDL) model of the first instance of the semiconductor device using the nominal value look-up table and the plurality of process variation look-up tables; and
  manufacturing the second instance of the semiconductor device based on the HDL model.

10. The computer implemented method according to claim 9, wherein calculating the bias-dependent coefficient comprises calculating positive current dependence ($I_d(plus)$) and negative current dependence ($I_d(Minus)$) using values from the nominal value lookup table.

11. The computer implemented method according to claim 10, further comprising using the positive current dependence ($I_d(plus)$) and negative current dependence ($I_d(Minus)$) to generate an arithmetic average of $I_d$ ($I_d(ave1)$) and a geometrical average of $I_d$ ($I_d(ave2)$).

12. The computer implemented method according to claim 9, further comprising calculating electrical current $I_d$ as $$I_d = \eta \cdot I_d(lin) + (1-\eta) \cdot I_d(exp),$$

wherein ($I_d(lin)$) comprises a linear dependence value, and ($I_d(exp)$) comprises an exponential dependence value.

13. The computer implemented method according to claim 9, further comprising using a damping factor $\beta$ to calculate electrical current $I_d$ as $$I_d = \beta \cdot \eta \cdot I_d(lin) + (1-\beta \cdot \eta) \cdot I_d(exp),$$

wherein ($I_d(lin)$) comprises a linear dependence value, and ($I_d(exp)$) comprises an exponential dependence value.

14. A computer implemented method for manufacturing of a second instance of a semiconductor device, the method comprising:
  manufacturing a first instance of the semiconductor device;
  providing a technology computer aided design data set corresponding to nominal performance of the first instance of the semiconductor device based on manufacturing data from manufacturing the first instance of the semiconductor device;
  identifying a plurality of process variations that occurred during manufacturing of the first instance of the semiconductor device;
  generating a nominal value look-up table comprising electrical parameters of the first instance of the semiconductor device corresponding to nominal values of each of the plurality of process variations;
  generating a plurality of process variation look-up tables of electrical parameters of the first instance of the semiconductor device using variation values corresponding to each of the plurality of process variations that were identified by performing operations comprising:
    generating a statistical distribution of process variation values that range from the nominal value of the process variation to a process variation limit;
    calculating a plurality of dependence values corresponding to the process variation values; and
    calculating electrical current $I_d$ as $$I_d = \eta \cdot I_d(lin) + (1-\eta) \cdot I_d(exp),$$

wherein ($I_d(lin)$) comprises a linear dependence value, and ($I_d(exp)$) comprises an exponential dependence value;
  building a Verilog-A based model of the first instance of the semiconductor device using the nominal value look-up table and the plurality of process variation look-up tables; and manufacturing the second instance of the semiconductor device based on the Verilog-A model.

15. The computer implemented method according to claim 14, wherein the Verilog-A based model is further configured to generate smooth current-voltage and capacitance-voltage curves in a full operating range of the first instance of the semiconductor device.

16. The computer implemented method according to claim 14, wherein the Verilog-A based model of the first instance of the semiconductor device uses the nominal value look-up table, one of the plurality of process variation look-up tables corresponding to a positive number of standard deviations for each of the identified process variations and one of the plurality of process variation look-up tables corresponding to a negative number of standard deviations for each of the identified process variations.

* * * * *